United States Patent [19]

Becker

[11] Patent Number: 4,858,941

[45] Date of Patent: Aug. 22, 1989

[54] TIRE SPRAY CONTROL DEVICE

[76] Inventor: John H. Becker, 528 Retreat Dr., Bldg. 1-202, Naples, Fla. 33963

[21] Appl. No.: 76,699

[22] Filed: Jul. 23, 1987

[51] Int. Cl.⁴ .............................................. B62B 9/16
[52] U.S. Cl. ..................................... 280/851; 280/848
[58] Field of Search ..................... 280/154.5 R, 152 R, 280/152 A, 153 R, 153 A

[56] References Cited

U.S. PATENT DOCUMENTS

| | | |
|---|---|---|
| 3,834,732 | 9/1974 | Schons ........................ 280/154.5 R |
| 4,205,861 | 6/1980 | Roberts et al. ............. 280/154.5 R |
| 4,334,694 | 6/1982 | Iwanicki ..................... 280/154.5 R |
| 4,585,242 | 4/1986 | Sparks ........................ 280/154.5 R |
| 4,660,846 | 4/1987 | Morin .......................... 280/154.5 R |

FOREIGN PATENT DOCUMENTS

| | | |
|---|---|---|
| 297829 | 5/1930 | Fed. Rep. of Germany ... 280/152 R |
| 2025519 | 12/1971 | Fed. Rep. of Germany ... 280/154.5 R |
| 2524344 | 12/1976 | Fed. Rep. of Germany ... 280/154.5 R |
| 473134 | 7/1952 | Italy .............................. 280/152 R |
| 2144690 | 3/1985 | United Kingdom ......... 280/154.5 R |

Primary Examiner—Charles A. Marmor
Assistant Examiner—Eric Culbreth
Attorney, Agent, or Firm—Samuels, Gauthier, Stevens & Kehoe

[57] ABSTRACT

A structure to control the spray cast from rotating wheels. A forward plate spaced apart from the leading edge of a wheel includes openings which directs the water spray rearwardly and inwardly with reference to the direction of travel of the vehicle. A trailing plate is spaced apart from the trailing edge of the rotating wheel. A baffle is secured to the leading and trailing plates and perpendicular to the axis of rotation of the wheel(s). This baffle includes openings to direct the spray inwardly.

21 Claims, 7 Drawing Sheets

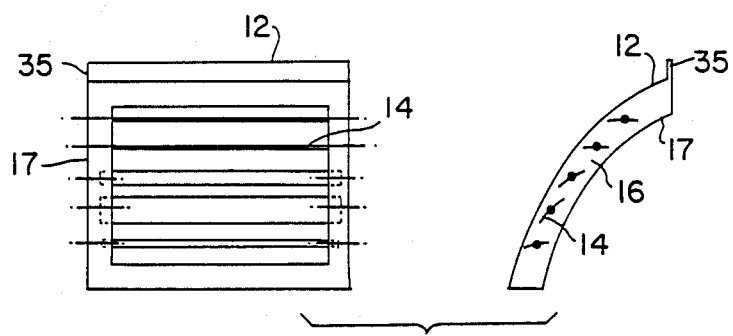
FIG. 2a
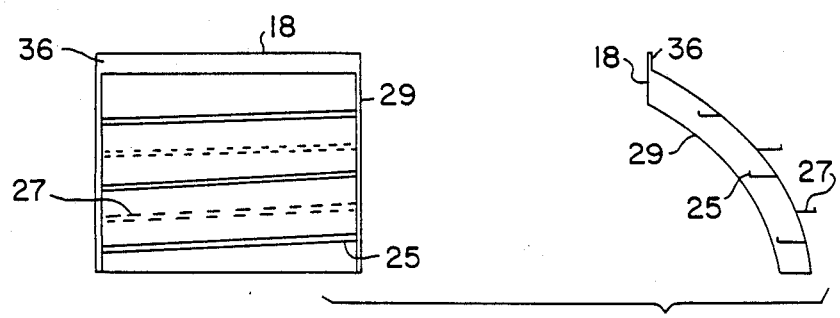
FIG. 2b
FIG. 2c
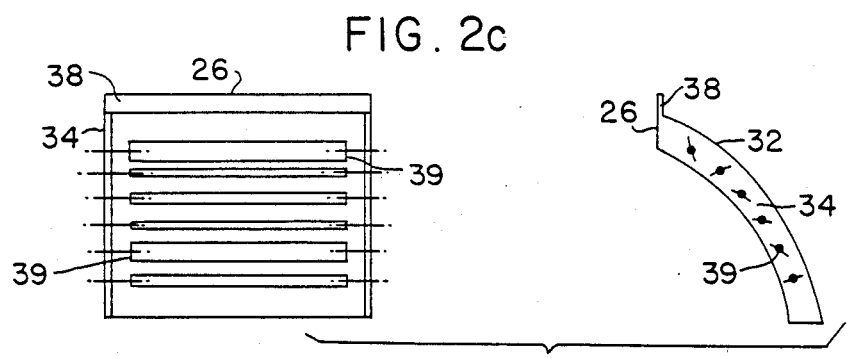

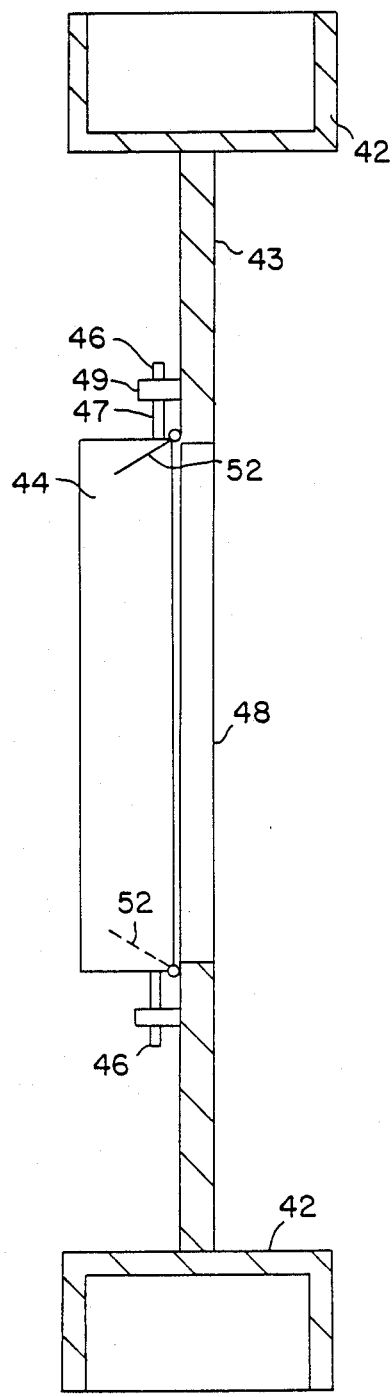
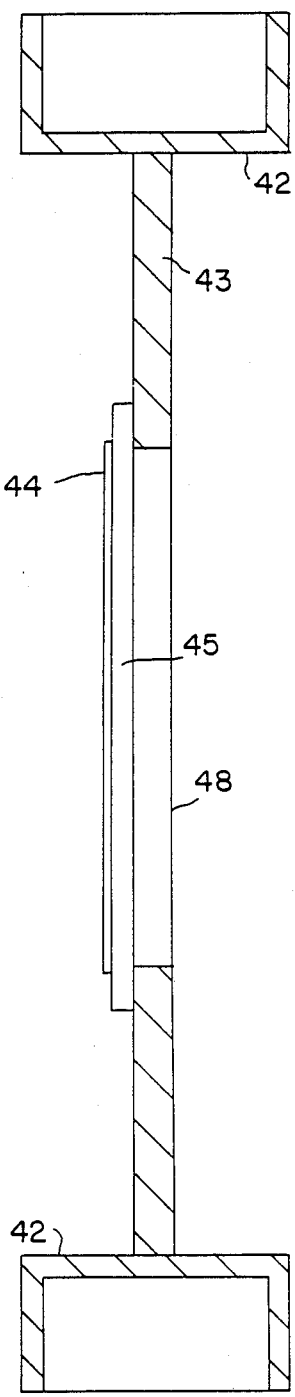
FIG. 4a
FIG. 4b

TIRE SPRAY CONTROL DEVICE

BACKGROUND AND SUMMARY OF THE INVENTION

The nation's highways provide a means whereby millions of trucks-trailer transports and the like are freight carriers and move a majority of cargo and commodities from one point to another.

There is no suitable device installed over or around the wheels of these transports to prevent the generation and dispersement of finely divided water streams or snow mists during a storm, which in turn are thrown sideways into the path and windshields of overtaking vehicles using the passing lane (or being passed). As a result thousands of the highway deaths occur each year and unlimited risks are taken by these passing motorists to themselves as well as others in the immediate vicinity. (Highway safety reports 40,000 deaths occur each year).

The disclosed invention prevents water streams or snow mists from being thrown sideways onto the windshields of smaller vehicles from the tires of larger vehicles. This will save lives and hundreds of million of dollars of damage claims. (The annual automobile insurance claims are estimated at 40 billion dollars).

In a preferred embodiment of the invention, the tire spray control device comprises a leading arcuate plate having louvers or blades which may be adjustable, movable or rotatable, defining openings, through which openings, pass air streams which control rain, snow or finally divided water streams which are thrown from the tires due to their high speed rotation and forward motion. This leading plate functions in combination with a trailing arcuate plate.

The trailing plate has louvered or blade-like openings which may be adjustable, movable or rotatable through which passes the spray or rooster tail water streams created by the rotation of the tire(s). This water spray is contained and is discharged through openings or the open bottom of the plate. In a particularly preferred embodiment, the blades are rotatable.

Where multiple wheels or axles are used, one or more intermediate plate(s) may be used which comprises a sheet having planar baffles secured to either side thereof. In an alternative embodiment, this plate may contain blades which are turnable, moveable, rotatable or have louvered-like openings. A first set of planar-like baffles is spaced apart from the leading wheel and the spray contacting the plate is directed by the baffles to the underside of the vehicle carriage. A second set of planar-like baffles is spaced apart from the trailing wheel(s) to direct the flow of water and spray to the underside of the carriage.

In another aspect of the invention an aero-dynamic baffle in a substantially planar configuration is secured either to the plates, or to the vehicle housing, or both to form a wind screen. The baffle is substantially perpendicular to the axis of rotation of the wheel. The wind screen controls the spray which is thrown laterally outward from the wheel by redirecting the spray inwardly and downwardly.

In a preferred embodiment, the baffle contains several outwardly opened vertical strips. The forward moving vehicle causes airstreams of high velocity to pass through the vertical slots. These air streams create a wind-screen containment zone which entrains the spray and prevents it from being thrown outwardly from the wheels into the path of the passing lane and redirects the spray inwardly.

In still another aspect of the invention, the shell is used in combination with the baffle.

BRIEF DESCRIPTION OF THE DRAWINGS

FIG. 2a is an end view and an elevation view of a leading plate

FIG. 2b is an end view and an elevation view of an intermediate plate;

FIG. 2c is an ed view and an elevation view of a trailing plate;

FIG. 4a is an end view of FIG. 3 along lines 4a—4a with slats in an open position;

FIG. 4b is an end view of FIG. 3 with slats in a closed position;

DESCRIPTION OF THE PREFERRED EMBODIMENT(S)

Figure 1:
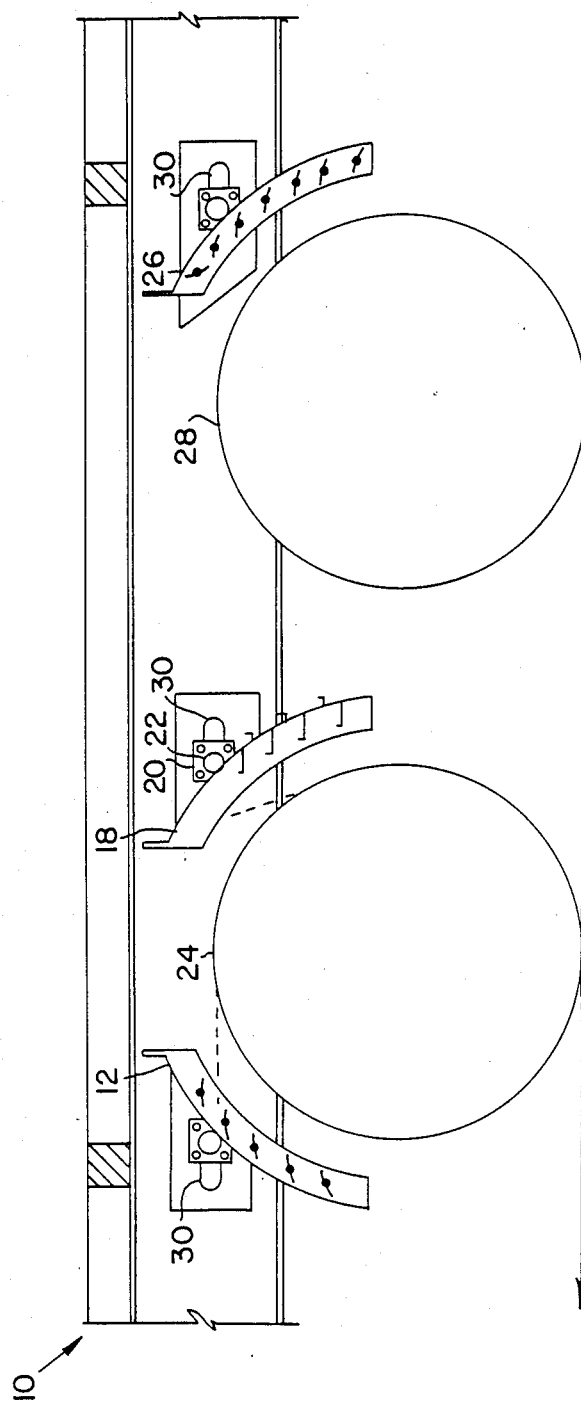
FIG. 1 is a side view of an assembly embodying the invention disposed around the wheels of a tractor-trailer vehicle.
Figure 3:
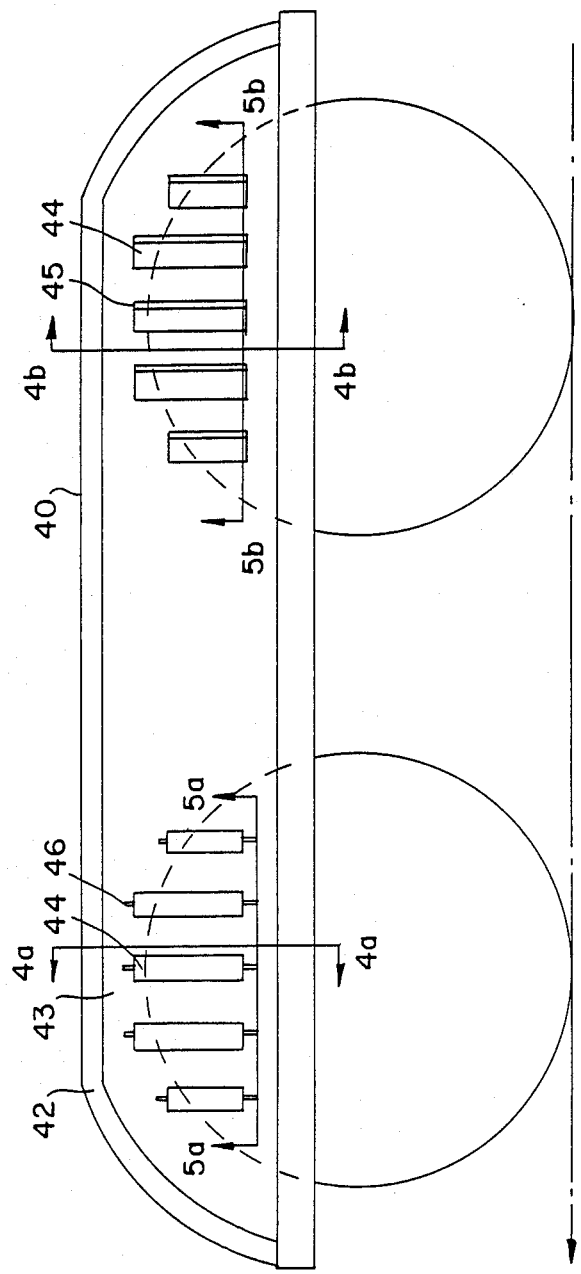
FIG. 3 is an elevation of an aero-dynamic baffle.
Figure 5A:
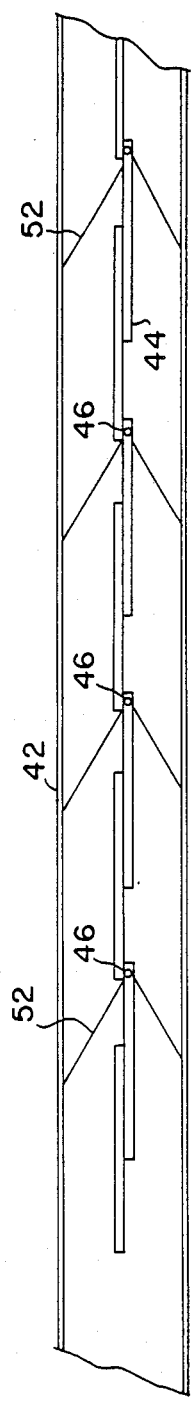
FIG. 5a is a top view of FIG. 4a with slats closed.
Figure 5B:
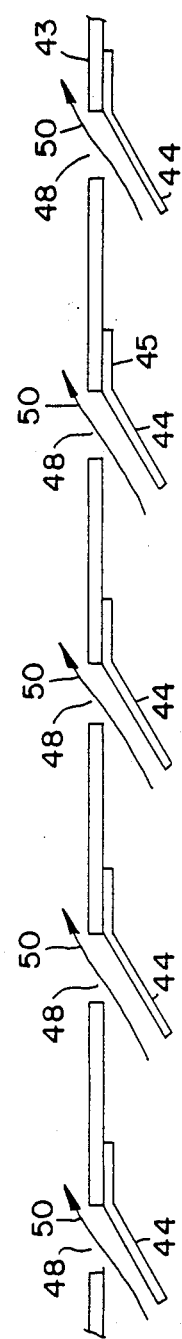
FIG. 5b is a top view of FIG. 5a with the slats opened.
Figure 6A:
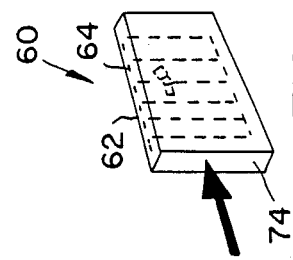
FIG. 6 is a front view of a leading plate with non-uniform blades.
Figure 6B:
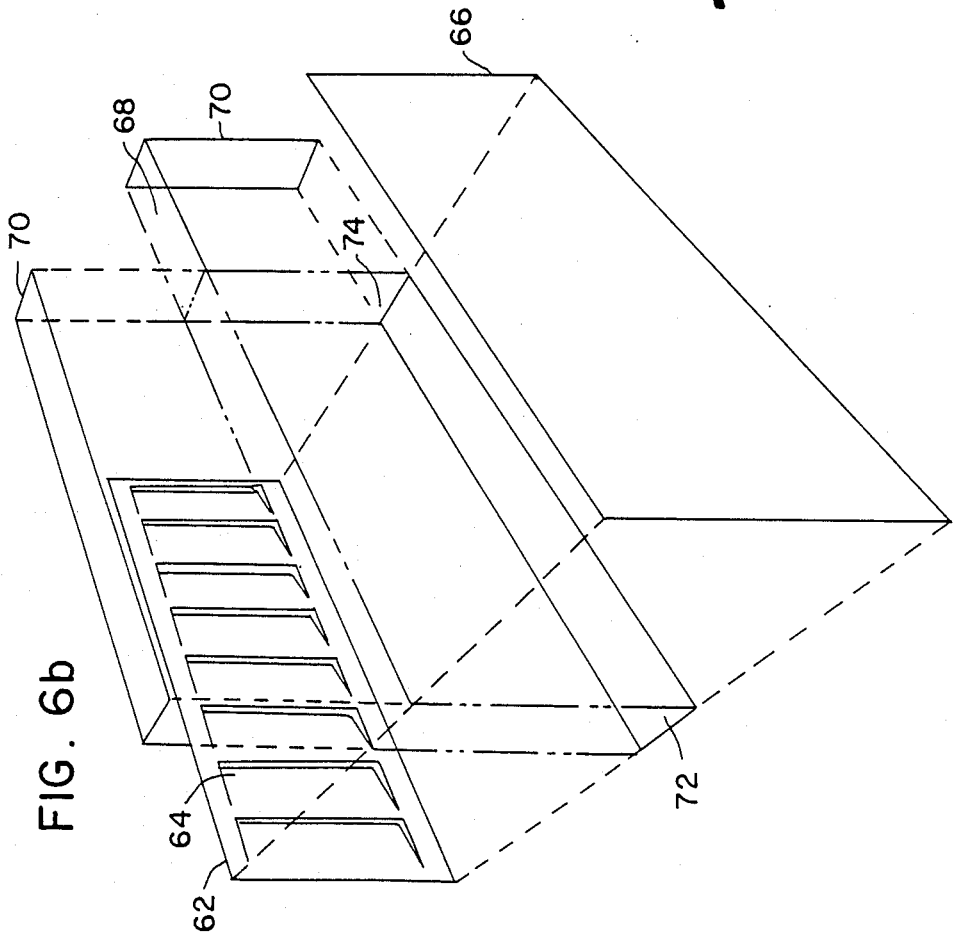
Figure 7A:
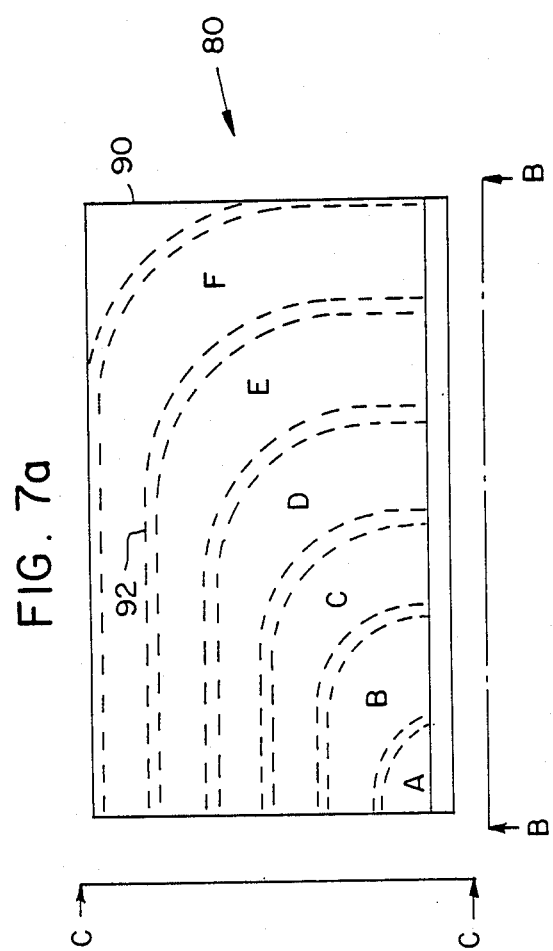
Figure 7B:
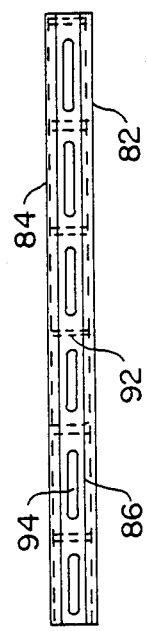
Figure 7C:
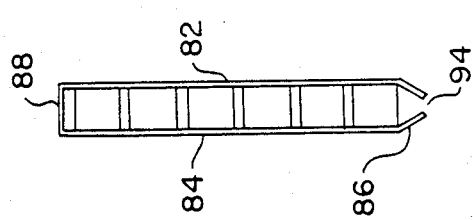

Referring to FIG. 1, a side view of an assembly for a double wheeled tractor is shown generally at 10 and comprises a leading arcuate plate 12, a trailing arcuate plate 26 and an intermediate plate 18. The plates 12 and 18 are spaced apart from the rotating surface of a forward wheel 24 and the plates 18 and 26 are spaced apart from the outer surface of a rearward rotating wheel 28. The spacing of the plates along the longtitudinal axis of the carrier or the carriage of the vehicle will vary depending upon tire size, and the width of the plates will also vary depending upon the number of wheels, whether single or paired.

Support members 20 are fastened to the plates 12, 18 and 26. These members 20 are joined to the carriage of the tractor or trailer by bolts 22 or by any suitable manner. These members 20 include slots 30 such that the plates may be adjusted along the longtitudinal axis of the carriage.

More particularly, the structure of the plates is shown in greater detail in FIGS. 2a, 2b and 2c. The leading arcuate plate 12 FIG. 2a comprises blades 14 which define openings 16. The blades 14 are joined to the sides 17 by bolting or other locking devices. More specifically, a threaded stud on each end of the blade(s) passes through the side and is secured by a lock nut. In this way, the angle of the blade may be varied and different sized blades used. The blades may be installed horizontally as shown or vertically or at any angle therebetween. These openings control the air streams flowing therethrough such that the spray from the front surface of the enclosed tire is directed inwardly an rearwardly.

The intermediate plate 18 in FIG. 2b has forward planar-type baffles 25 and rearward planar-type baffles 27. These are dimensioned and positioned to deflect the streams of water generated from the forward and rearward tires inwardly and toward the underside of the carriage. An outer retaining wall 29 inhibits discharge of water outwardly from the assembly 10. There is no corresponding inner wall. The baffles 25 and 27 may be a separate attachment or formed from the plate 18 itself. Alternatively, the plate 12 may be used as an intermediate plate with its concave surface at the same position as the concave surface of the plate 18 in FIG. 1.

The trailing plate 26 comprises an outer sheet 32 with inwardly extending parallel sides 34. Blades 39 are journaled to the walls 34 whereby the continuous rotation of the blades 39 is effected by movement of the wind currents flowing across them. The blades direct the spray against the sheet 32 and downwardly. Alternatively, the blades may be fixed, movable or rotatable in any position from vertical to horizontal. The blades 39 may be bolted to the sides 34 in the same manner that the blades 14 are bolted to the sides 17. The blades 39 may be secured to the sides 34 is a uniform or non-uniform array and/or the blades may themselves be uniform or non-uniform.

The upper ends of the plates 12, 18 and 32 have flanges 35, 36 and 38 respectively. Cross members (not shown) are bolted to these flanges, and the cross members are bolted to the carriage for additional stability.

Referring to FIG. 3, a generally planar baffle 40 is secured to the outer walls of the plates 12, 18 and 30 in a position substantially perpendicular to the axis of rotation of the wheels. The baffle comprises a frame 42, a panel 43 and vertical slats 44. The baffle will vary in face width (length) to adequately cover single or multi-wheeled vehicles. The panel 43 is characterized by openings 48, FIG. 5*b*.

The slats may either be fixed in an open position to direct the wind through the openings and onto the rotating wheel or they may be biased to a closed position and adapted to open as the vehicle moves in a forward direction. Two alternative embodiments of spring biased slats are shown in FIGS. 3, 4*a*, 4*b*, 5*a* and 5*b*.

In FIG. 3, two types of slats are shown schematically. The slats on the left hand side of FIG. 3 are pinned to the panel and the slats on the right hand side of FIG. 3 are hinged to the panel.

Referring to FIGS. 4*a* and 5*a*, movably pinned to the panel 43 are the vertical slats 44 which have pins 46 at each end. The pins 46 pass through holes 47 in tabs 49. A hole is located in the pin 46 through which closure spring 52 is inserted which keeps the vertical slats 44 biased in a closed position as shown in the top view of FIG. 5*a*.

Alternatively, referring to FIGS. 4*b* and 5*b*, plates 45 are secured adjacent the openings 48 in the panel and the slats 44 are joined to the plates 45 by spring biased hinges. Alternatively, the slats may be secured in an open position.

Through the vertical openings 48 pass aero-dynamic streams 50 as shown in FIG. 5*b*. The streams 50 entrain or screen the water mist and the turbulent air mass surrounding each turning wheel in the zone defined by the opposed surface of the baffle and the wheel(s). Similarly, this controls the light powdery snow which is swirled by the wind turbulence of the turning wheels. Actual observations of the tires establishes that the tires are cooler when such a baffle is used then when such a baffle is not used. Inherently the brakes are also cooler with the just described configurations. Typically in large multi-wheeled vehicles a partial vacuum is created in the region under the carriage. This vacuum tends to create a drag on the vehicle. By directing the spray and thereby the air flow to the underside of the carriage. this vacuum is diminished thereby reducing drag on the vehicle.

The vertical slat 44 may be constructed from various materials such as wood, hard rubber, metals and polychemicals. The strips are usually rectangular in shape, solid or hollow and are relatively thin to reduce the unit weight but still maintain the strength requirements.

The shell-baffle combination of FIGS. 1-5 is especially suitable for vehicles where there is considerable distance between the wheels and associated fenders. In some vehicles, the wheels are recessed in a well, such as rear bus wheels and baffles per se are suitable for purposes of this invention.

Referring to FIG. 6 a leading plate 60 is shown having non-uniform blades 62 and 64.

The location of the baffle(s) with respect to the wheel(s) will vary. Typically, the bottom of the baffle(s) will be positioned such that the upper third of the wheel(s) is shielded, preferably the upper half.

The invention has been described with specially shaped slats, channels, orifices, etc. It is within the scope of this invention that any geometric configuration may be used to control the flow of the water (particulates) discharged from the tire. For example, the leading plate has been described as having louvered openings. Any fluid-permeable plate may be used whereby the air may flow therethrough to control the spray from the tire.

An embodiment of the baffles has been described where the slats are biased to a closed position and opened in response to air pressure to form a wind screen to prevent particulate matter from spraying outwardly from the vehicle wheels. The slats may overlap, abut or be spaced apart from one another when in a closed position. Further, the slats need not be vertical they may be angled with reference to vertical. Alternatively, fixed louvered openings may be formed in the baffle.

Having described my invention, what I now claim is:

1. A device for the control of the liquid particulate spray cast from a rotating wheel of a vehicle which comprises:

(a) a leading plate adapted to be spaced apart from the leading surface of the wheel, said plate comprising parallel sides and a plurality of openings defined by blades joined to the sides through which an airstream passes, the openings shaped and spaced such that the airstream directs the spray inwardly and rearwardly;

(b) a trailing plate comprising a back sheet, a plurality of vanes secured to the sheet in spaced apart relationship from the sheet and from one another, the vanes shaped and spaced to direct the spray to the back sheet and inwardly and downwardly; and (c) means to secure the plates to the vehicle.

2. The device of claim 1 wherein the blades are horizontal.

3. The device of claim 1 wherein the blades are spaced apart in parallel relationship.

4. The device of claim 2 wherein the blades are spaced apart in non-uniform relationship.

5. The device of claim 2 wherein the blades are of non-uniform size.

6. The device of claim 2 wherein the angles at which the blades are secured to the sides are equal.

7. The device of claim 2 wherein the blades are secured to the sides at unequal angles.

8. The device of claim 1 wherein the back sheet comprises inwardly extending parallel sides and the blades are secured to the sides.

9. The device of claim 8 wherein the blades are horizontal.

10. The device of claim 9 wherein the blades are spaced apart in parallel relationship.

11. The device of claim 9 wherein the blades are spaced apart in non-uniform relationship.

12. The device of claim 8 wherein the blades are of non-uniform size.

13. The device of claim 8 wherein the angles at which the blades are secured to the sides are equal.

14. The device of claim 8 wherein the blades are secured to the sides at unequal angles.

15. The device of claim 8 wherein the blades are rotatable.

16. The device of claims 7 or 8, wherein there are at least two rotating wheels, a forward wheel and a rearward wheel, secured to parallel axles and wherein the device comprises:
an intermediate plate interposed between the forward and rearward wheels, the plate having a first side facing the trailing surface of the forward wheel and a second side facing the leading surface of the trailing wheel, each side characterized by a plurality of baffles adapted to direct the spray contacting the surfaces inwardly with reference to the longitudinal axis of the vehicle.

17. The device of claim 16 wherein the intermediate plate is an arcuate plate and its concave surface is spaced apart from the trailing surface of the forward wheel.

18. The device of claim 1 which comprises:
a planar-like baffle spaced apart from and generally perpendicular to the axis of rotation of the wheel, said baffle comprising means to form a wind screen to entrain and control the liquid spray.

19. The device of claim 18 wherein the means to form a wind screen comprise a plurality of slats.

20. The device of claim 19 wherein the slats are arrayed in uniform, spaced apart parallel relationship.

21. The device of claim 18 wherein the baffle comprises a housing, which housing defines a chamber, the housing having an inner wall spaced apart from the rotating wheel, said inner wall characterized by a plurality of openings and the housing having an open front face whereby when the vehicle moves the air flowing through into the chamber is discharged through the openings in the inner wall to form the wind screen which contacts and controls the discharge of the spray from the wheel.

* * * * *